(12) United States Patent
Matsumura et al.

(10) Patent No.: US 9,098,948 B2
(45) Date of Patent: Aug. 4, 2015

(54) IMAGE MATCHING APPARATUS AND IMAGE MATCHING METHOD

(75) Inventors: Takeshi Matsumura, Tokyo (JP); Johan Hjelm, Tokyo (JP); Shingo Murakami, Kanagawa (JP); Toshikane Oda, Tokyo (JP); Kenta Yasukawa, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 263 days.

(21) Appl. No.: 13/877,273

(22) PCT Filed: Oct. 22, 2010

(86) PCT No.: PCT/JP2010/069236
§ 371 (c)(1),
(2), (4) Date: Apr. 1, 2013

(87) PCT Pub. No.: WO2012/053118
PCT Pub. Date: Apr. 26, 2012

(65) Prior Publication Data
US 2013/0187953 A1    Jul. 25, 2013

(51) Int. Cl.
*G06F 15/16*    (2006.01)
*G06F 7/00*    (2006.01)
(Continued)

(52) U.S. Cl.
CPC .......... *G06T 11/60* (2013.01); *G06F 17/30247* (2013.01);
(Continued)

(58) Field of Classification Search
CPC ......... G09G 5/14; G06K 9/00; G06K 9/6203; G06F 17/30265

USPC ........... 345/629–641; 382/181, 209, 305, 306
See application file for complete search history.

(56) References Cited

U.S. PATENT DOCUMENTS

| 7,200,683 B1* | 4/2007 | Wang et al. .................. 709/250 |
| 2008/0094417 A1* | 4/2008 | Cohen .......................... 345/632 |

(Continued)

FOREIGN PATENT DOCUMENTS

| JP | 2001-142825 A1 | 5/2001 |
| JP | 2003-323440 A1 | 11/2003 |
| JP | 2003-330953 A1 | 11/2003 |
| JP | 2008-250474 A1 | 10/2008 |
| WO | WO 2010/113466 A1 | 10/2010 |

OTHER PUBLICATIONS

Extended European Search Report for PCT Application No. PCT/JP2010/069236, mailed May 6, 2014, 6 pages.

(Continued)

*Primary Examiner* — Ke Xiao
*Assistant Examiner* — Andrew Shin
(74) *Attorney, Agent, or Firm* — Myers Bigel Sibley & Sajovec, P.A.

(57) ABSTRACT

An image matching apparatus is provided. The apparatus includes a storage unit, an obtaining unit, a specification unit, and an image matching unit. The storage unit is configured to store image data of one or more devices that are connected to a local network. The obtaining unit is configured to obtain image data of device image obtained by capturing a device. The specification unit is configured to specify one or more local networks to be used for image matching. The image matching unit is configured to perform image matching of the obtained image data against the stored image data of one or more devices that are connected to the specified local network.

9 Claims, 11 Drawing Sheets

(51) Int. Cl.
  *G09G 5/00* (2006.01)
  *G06K 9/00* (2006.01)
  *G06K 9/62* (2006.01)
  *G06T 11/60* (2006.01)
  *G09G 5/14* (2006.01)
  *H04L 29/08* (2006.01)
  *G06T 19/00* (2011.01)
  *G06F 17/30* (2006.01)

(52) U.S. Cl.
  CPC ........... *G06F 17/30864* (2013.01); *G06K 9/00* (2013.01); *G06K 9/6201* (2013.01);*G06K9/6203* (2013.01); *G06T 19/00* (2013.01); *G06T 19/006* (2013.01); *G09G 5/14* (2013.01); *H04L 29/08072* (2013.01)

(56) References Cited

U.S. PATENT DOCUMENTS

| | | |
|---|---|---|
| 2010/0135527 A1 | 6/2010 | Wu et al. |
| 2010/0191459 A1 | 7/2010 | Carter et al. |
| 2011/0135207 A1* | 6/2011 | Flynn et al. ............. 382/209 |

OTHER PUBLICATIONS

International Search Report, PCT/JP2010/069236, Nov. 22, 2010.
Written Opinion of the international Searching Authority, PCT/JP2010/069236, Nov. 22, 2010.

* cited by examiner

F I G. 9
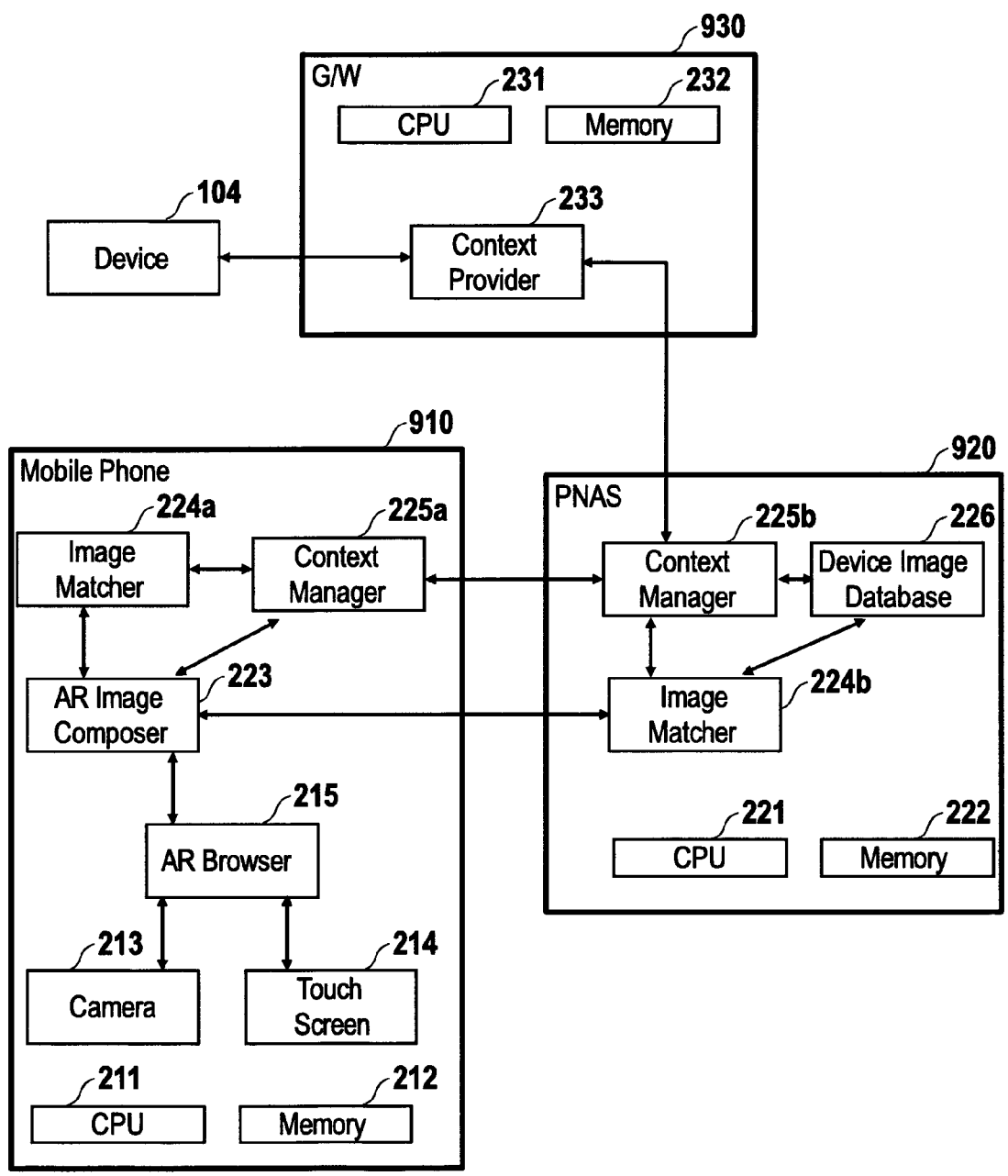

IMAGE MATCHING APPARATUS AND IMAGE MATCHING METHOD

CROSS REFERENCE TO RELATED APPLICATION

This application is a 35 U.S.C. §371 national stage application of PCT International Application No. PCT/JP2010/069236 filed on 22 Oct. 2010, the disclosure and content of which is incorporated by reference herein in its entirety. The above-referenced PCT International Application was published in the English language as International Publication No. WO 2012/053118 A1 on 26 Apr. 2012.

TECHNICAL FIELD

The present invention relates to an image matching apparatus and image matching method.

BACKGROUND

It becomes possible to visualize an environment using an overlay of received images from a network on top of images which are received from a camera, together with any additional information which may also be received from the network (such as which music is being played on the devices, etc). This type of enhanced view is frequently referred to as "augmented reality" (AR).

An AR application needs to identify a device that a user requests to obtain the information. Sekai-camera, an example of the AR application, identifies a target device based on the location information of a mobile device which has captured the target device. The location information is computed using the GPS, motion and angle sensors in the mobile device. However, GPS does not provide sufficient accuracy and populating the location of each device bothers the end user and won't be accepted. ARToolKit, another example of the AR application, identifies a target device by utilizing markers to be captured by the camera. However, the end user needs to put the markers on the different places and thus the end user won't accept this solution.

US2010135527 proposes an AR application which identifies a device by performing image matching. According to this application, a mobile internet device compares a captured device image against a plurality of candidate device images stored in an image database to identify the captured device. This solution is superior to Sekai-camera and ARToolKit because the solution need not use location information and markers. However, when the image database stores a lot of device images, the processing time of the image matching will increase and accuracy of the image matching will also degrade. Therefore, it is desirable to improve the processing time and accuracy of image matching.

SUMMARY

According to an aspect of the present invention, an image matching apparatus is provided. The apparatus includes a storage unit configured to store image data of one or more devices that are connected to a local network; an obtaining unit configured to obtain image data of device image obtained by capturing a device; a specification unit configured to specify one or more local network to be used for image matching; and an image matching unit configured to perform image matching of the obtained image data against the stored image data of one or more devices that are connected to the specified local network.

Further features of the present invention will become apparent from the following description of exemplary embodiments with reference to the attached drawings.

BRIEF DESCRIPTION OF THE DRAWINGS

FIG. 9 illustrates an exemplary deployment of components according to a third embodiment.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

One aspect of the present invention relates an image matching apparatus which performs image matching. The image matching is a process for identifying a device by use of image data of the device. The image data of the device may be a picture of the device itself or feature values extracted from the picture of the device such as shape, color, and so on. The image data used for image matching depends on algorithms of the image matching such as Scale Invariant Feature Transform (SIFT), Speeded-Up Robust Features (SURF), and Features from Accelerated Segment Test (FAST). Hereinafter, the term "device image" represents a picture of a device and the term "image data" represents data used for performing image matching of a device. The device image may be a still image or a frame of a moving image.

Figure 1:
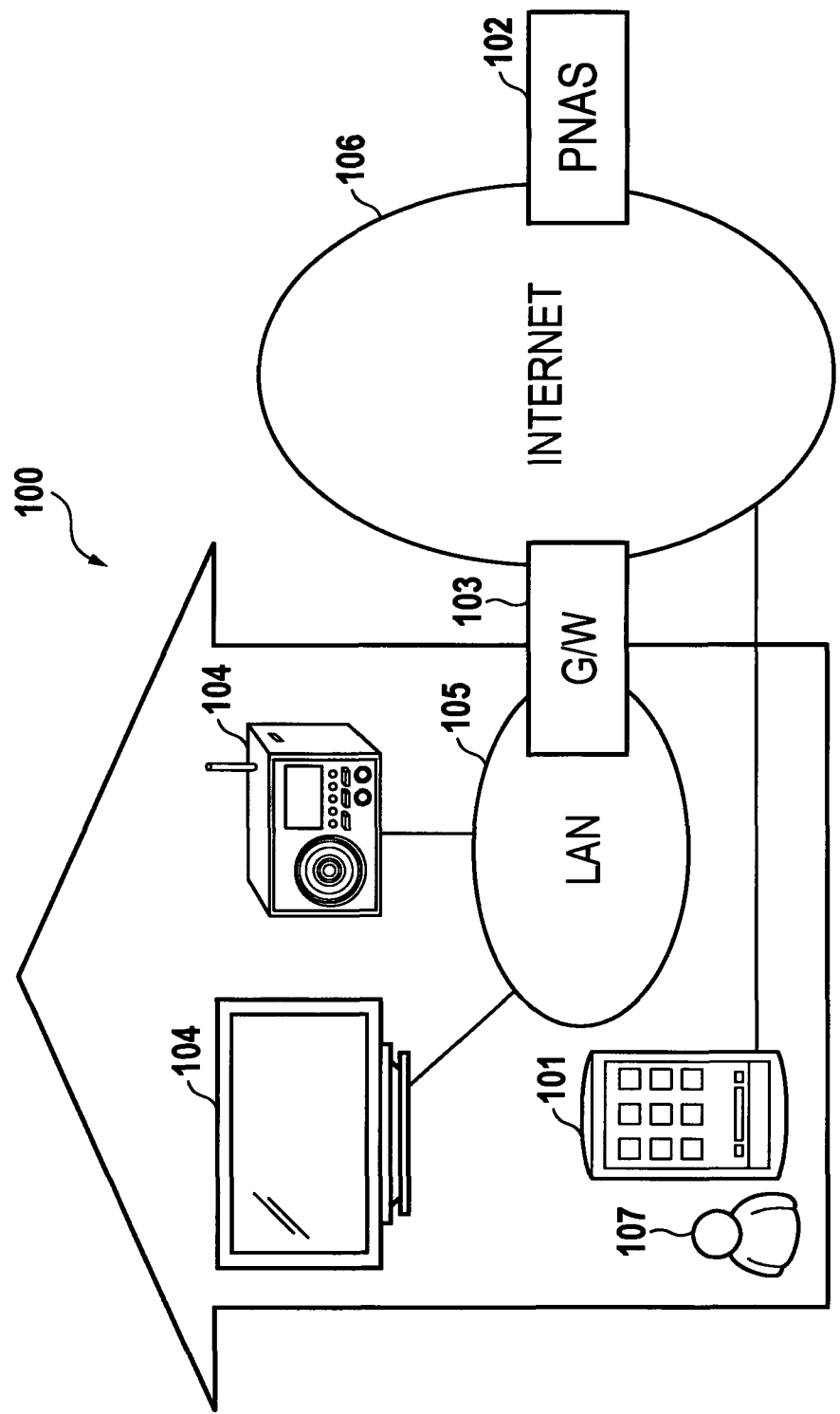
FIG. 1 illustrates an exemplary system which may include an image matching apparatus according to some embodiments.

FIG. 1 illustrates an exemplary system 100 in which the image matching apparatus according to some embodiments of the present invention may apply. In the followings, the image matching apparatus will be described in contexts of an Augmented Reality (AR) application. However, the image matching apparatus may be used for other applications as described later. The system 100 may include a mobile phone 101, a Personal Network Application Server (PNAS) 102, a gateway (G/W) 103, and one or more devices 104. Any of the mobile phone 101, the PNAS 102, and the G/W 103 may operate as the image matching apparatus as described later.

The mobile phone 101 is a mobile device which provides a user 107 with an AR image. The mobile phone 101 is an example of a user terminal and other user terminals such as a laptop PC, a desktop PC, and a digital camera can be used.

The G/W 103 is a gateway device between the LAN 105 and the Internet 106 and may manage the LAN 105. The Devices 104 are connected to the LAN 105 and provide their information to the PNAS 102 via the G/W 103. Any devices which can connect to a local network may be identified by the image matching apparatus according to embodiments of the present invention. The local network includes a home network as shown in FIG. 1, as well as an in-car network, an office network, and other closed networks. The devices 104 are reachable from the PNAS 102 by using known remote access technologies. According to embodiments of the present invention, devices to be compared against an input device are narrowed down to the devices which are connected to a local network in order to keep the image matching simple and less resource-demanding.

The PNAS 102 is a server for aggregating device capabilities and status information discovered in a local network such as a home and in-car networks. In some embodiments, the PNAS 102 provides an image matching service to the mobile phone 101.

First Embodiment

Figure 2:
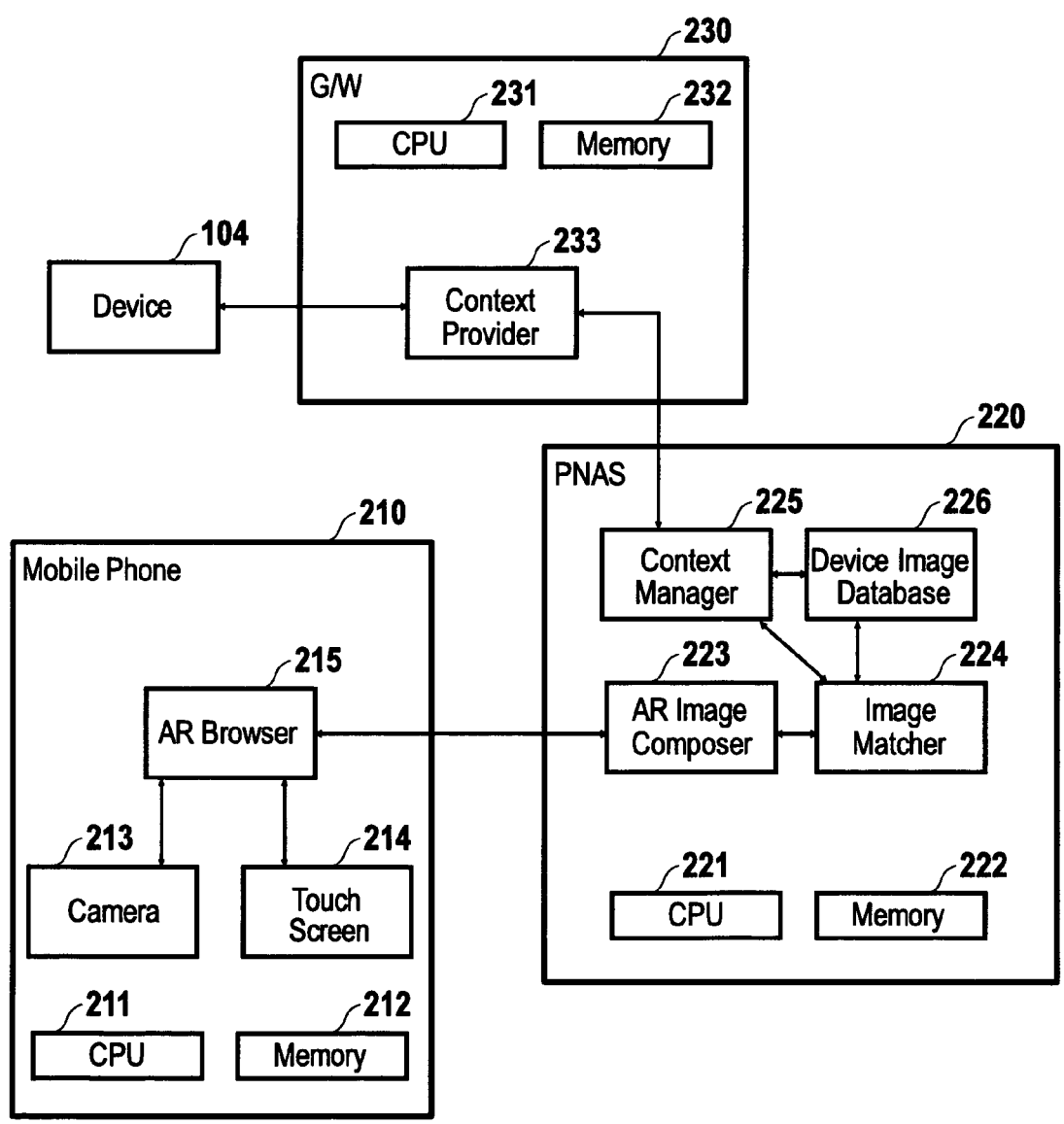
FIG. 2 illustrates an exemplary deployment of components according to a first embodiment.

FIG. 2 illustrates an exemplary configuration of each device in the system 100 according to a first embodiment of the present invention. A mobile phone 210, a PNAS 220, and a G/W 230 in FIG. 2 correspond to the mobile phone 101, the PNAS 102, and the G/W 103 in FIG. 1 respectively. In the first embodiment, the PNAS 220 operates as an image matching apparatus.

The mobile phone 210 may include a CPU 211, a memory 212, a camera 213, a touch screen 214, and an AR browser 215. The CPU 211 controls overall operations of the mobile phone 210. For simplicity, arrows between the CPU 211 and each component in the mobile phone 210 are not shown. The memory 212 stores computer programs and data used for operations of the mobile phone 210. The camera 213 is an image forming unit for capturing an image including a device image of a device 104. The camera 213 may capture a still image or a moving image according to an instruction from the user 107. The camera 213 provides the captured image to the AR browser 215. The touch screen 214 displays an AR image provided by the AR browser 215. The touch screen 214 operates as both input and output units, but the mobile phone 210 may include an input device such as a keypad and an output device such as non-touch display separately, instead of or in addition to the touch screen 214.

The AR browser 215 obtains the captured image from the camera 213 and then sends the captured image to the PNAS 220 to request an AR image of the captured image. The AR browser 215 receives the AR image from the PNAS 220 as a response and then provides the AR image to the touch screen 214.

The G/W 230 may include a CPU 231, a memory 232, and a context provider 233. The CPU 231 controls overall operations of the G/W 230. For simplicity, arrows between the CPU 231 and each component in the G/W 230 are not shown. The memory 232 stores computer programs and data used for operations of the G/W 230.

The context provider 233 discovers devices 104 which are connected to the LAN 105. The context provider 233 can discover devices 104 using, for example, protocols such as UPnP, DLNA, Zigbee, and Bluetooth. When the G/W supports more than one protocol, the context provider 233 may discover different LANs using different protocols. In addition to or instead of device discovery, the user 107 may register a device 104 to the context provider 233 manually. The context provider 233 also obtains context information from the discovered or registered devices 104. The context information of a device 104 is information which represents the device and may include static information such as the device identity, device type, device model, device manufacturer, device capability, and device's friendly name, a menu of the possible operations such as playing the music, opening a chat session with the friend of the user 107 as well as dynamic information such as what files, applications and multimedia contents are stored in the device, what services and applications are running, who is using the device, and a list of friends using the device 104 now. The context provider 233 provides the obtained context information to the PNAS 220. The context provider 233 has a unique identity which is used for identifying the one or more LAN 105 managed by the G/W 230.

The PNAS 220 obtains an image from the mobile phone 210, identifies a device included in the obtained image, and creates an AR image where the information about the identified device is overlaid. The PNAS 220 sends the resulted AR image back to the mobile phone 210.

The PNAS 220 may include a CPU 221, a memory 222, an AR image composer 223, an image matcher 224, a context manager 225, and a device image database 226. The CPU 221 controls overall operations of the PNAS 220. For simplicity, arrows between the CPU 221 and each component in the PNAS 220 are not shown. The memory 222 stores computer programs and data used for operations of the PNAS 220.

The device image database 226 stores context information which is common in all devices of the same model. Examples of the context information stored in the device image database 226 may include device model, device specification, release date, catalog price, and device manufacturer. The context information also includes image data of devices. The context information may also include the supported protocols which the context provider 223 can use to connect to a device of the device model. Instead of, or in addition to, the protocol information, reference to software which can be installed to the context provider 223 to connect to a device of the device model may be included in the context information. As described above, the image data depends on algorithms used for performing image matching. Thus, the device image database 226 may include different sets of image data for different algorithms. The device image database 226 may also include different sets of image data for device images obtained by capturing a device from different angles.

The context information may be registered to the device image database 226 through an administrative interface by the operator of the PNAS 220, a service provider of AR service, a user of AR service, and/or a device manufacturer. The device image database 226 may have a function to extract image data from a device image. The context information of a device model is associated to an identity of the device model such that the context information is retrieved by using the identity of the device model as a key. The identity of the device model may be a combination of the name of device manufacturer and the model name, or it may be a prefix of serial numbers which is common in the same device model, for example.

Figure 3A:
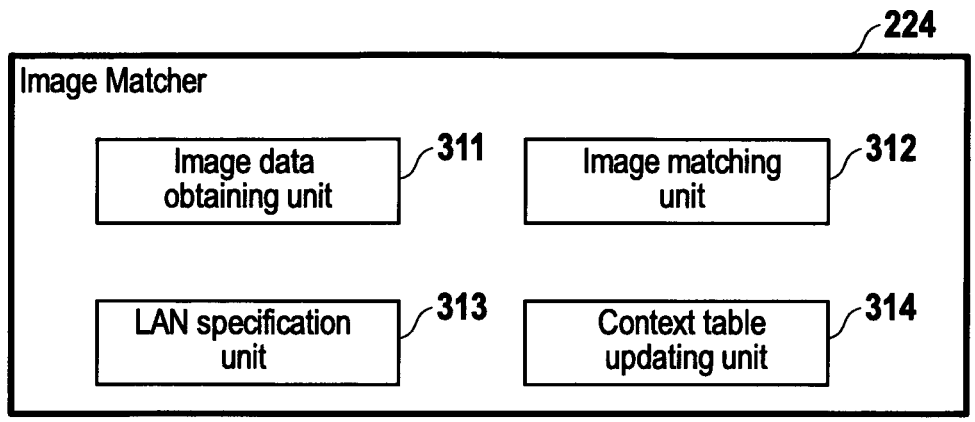
FIGS. 3A-3C illustrate exemplary details of components according to some embodiments.
Figure 3B:
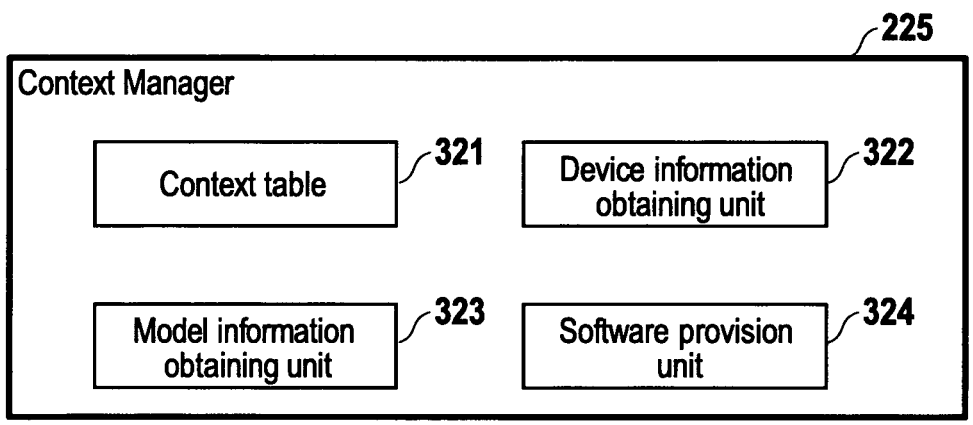

The context manager 225 manages image data used for performing image matching and context information. The context manager 225 may include a context table 321, a device information obtaining unit 322, a model information obtaining unit 323, and a software provision unit 324, as shown in FIG. 3B.

Figure 4:
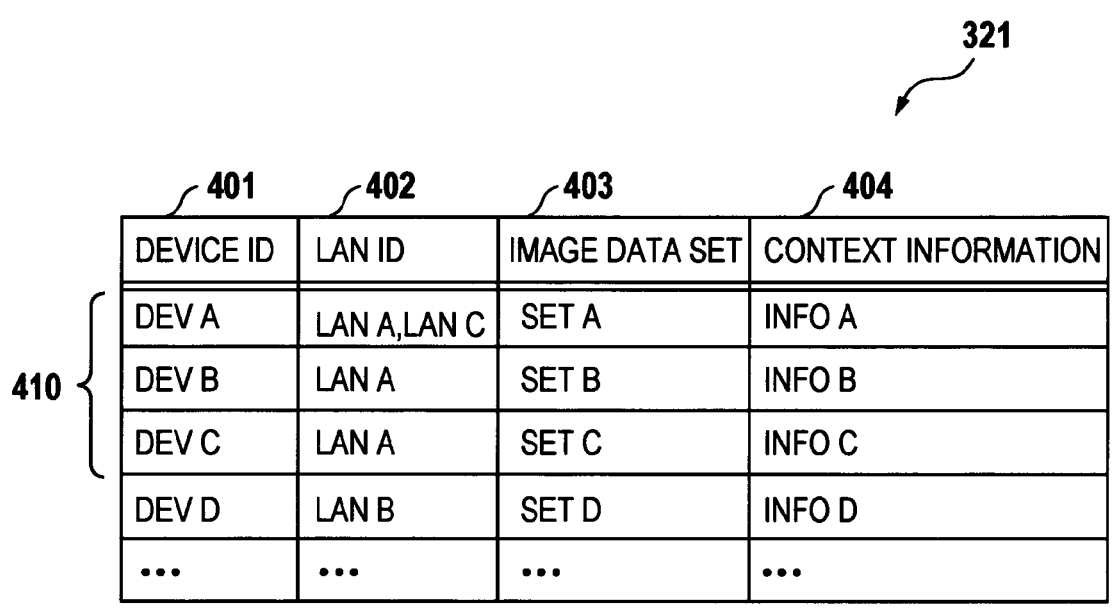
FIG. 4 illustrates an exemplary context table according to some embodiments.

FIG. 4 illustrates an example of the context table 321. The context table 321 stores a device identity of a device 104, a LAN identity of a LAN to which the device 104 is connected, a set of image data of the device 104 and context information of the device 104 such that the LAN identity, the set of image data, and the context information are associated with the device identity. The column "Device ID" 401 represents a device identity, the column "LAN ID" represents a LAN identity, the column "Image Data Set" represents a set of image data, and the column "Context information" represents context information. The LAN identity is an identity by which the PNAS 102 can uniquely identify a LAN. An example of the LAN identity is a pair of Global IP address of a G/W and private identity which the G/W use to manage the LAN. The context table 321 may include a plurality of entries for devices which are connected to different LANs. For example, the device "Dev A" is connected to both of the LANs "LAN A" and "LAN C", the device "Dev B" is connected to the LAN "LAN A", and the device "Dev D" is connected to the LAN "LAN B". A set of image data may include a plurality of image data such as different image data for device images of a device captured from different angles and different image data for performing different algorithms of image matching.

The device information obtaining unit 322 obtains a device identity of a device 104, a LAN identity of a LAN to which the device 104 is connected, and context information of the device 104. When the context table 321 does not include an entry for the device 104 whose device identity has been obtained, the device information obtaining unit 322 creates an entry in which the LAN identity and the context information are associated to the device identity. When the context table 321 already includes an entry for the device 104 whose device identity has been obtained, the device information obtaining unit 322 updates the LAN identity and the context information using the device identity as a key.

The model information obtaining unit 323 retrieves image data of a device 104 and context information which is common in a device model of the device 104 from the device image database 226. The model information obtaining unit 323 may use as a key a device model which included in the context information obtained from the context provider 233. The software provision unit 324 provides software with the context provider 233 as described later.

Both the device image database 226 and the context manager 225 stores image data, but image data for a certain device 104 stored in the device image database 226 and the context manager 225 may differ. The device image stored in the device image database 226 is common in a device model (in other word, is common in devices having the same design). On the other hand, the device image stored in the context manager 225 is specific to a single device 104 because the actual device image of a device 104 may be different from the device image of the device 104 which is common in a device model. For example, when the user 107 put a character seal on the surface of a device 104 to personalize the device 104, the captured device image containing the seal may degrade performance of image matching against the device image common in the device model.

Figure 3C:
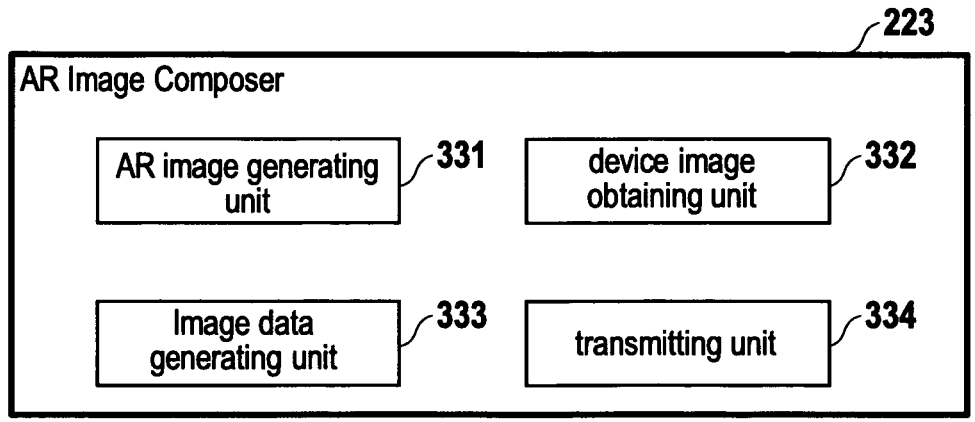

The AR image composer 223 generates an AR image based on the captured device image received from the mobile phone 210. In FIG. 2, the AR image composer 223 is included in the PNAS 220, but the AR image composer 223 may be included in the mobile phone 210 instead. The AR image composer 223 may include an AR image generating unit 331, a device image obtaining unit 332, an image data generating unit 333, and a transmitting unit 334, as shown in FIG. 3C.

The device image obtaining unit 332 obtains a captured image including a device image of the device 104 from the mobile phone 210. The image data generating unit 333 generates image data of the device 104 based on the device image of the device 104. As described above, the image data to be used for performing image matching depends on the algorithm of image matching. The AR image generating unit 331 sends the image data to the image matcher 224 and requests for performing image matching by use of the image data. The AR image generating unit 331 obtains context information for the identified device and generates an AR image by overlaying the context information onto the captured image. The transmitting unit 334 sends the generated AR image to the mobile phone 210.

The image matcher 224 identifies a device 104 whose image has been captured. The image matcher 224 may include an image data obtaining unit 311, an image matching unit 312, a LAN specification unit 313, and a context table updating unit 314. The image data obtaining unit 311 obtains image data from the AR image composer 223. The LAN specification unit 313 specifies a LAN 105 to be used for image matching. The image matching unit 312 compares the obtained image data against image data stored in the context table 321 of the context manager 225. The image matching unit 312 returns a result of the image matching to the AR image composer 223. For example, the image matching unit 312 returns a device identity of the captured device when the obtained image data matches one of image data stored in the context table 321 and returns an error when the obtained image data does not match any image data stored in the context table 321.

The image matching unit 312 uses the specified LAN identity to narrow down the number of image data against which image data of a captured device is compared. Devices whose image data are to be compared are referred as "candidate devices". An example will now be described with reference to the context table 321 in FIG. 4. Assume that the LAN specification unit 313 specifies that "LAN A" should be used for image matching because a device 104 whose image has been captured is likely to be connected to "LAN A". In that case, the image matching unit 312 selects "Dev A", "Dev B", and "Dev C" as candidate devices because their "LAN ID" 402 includes "LAN A" and then the image matching unit 312 compares the obtained image data against image data of the candidate devices.

Figure 5:
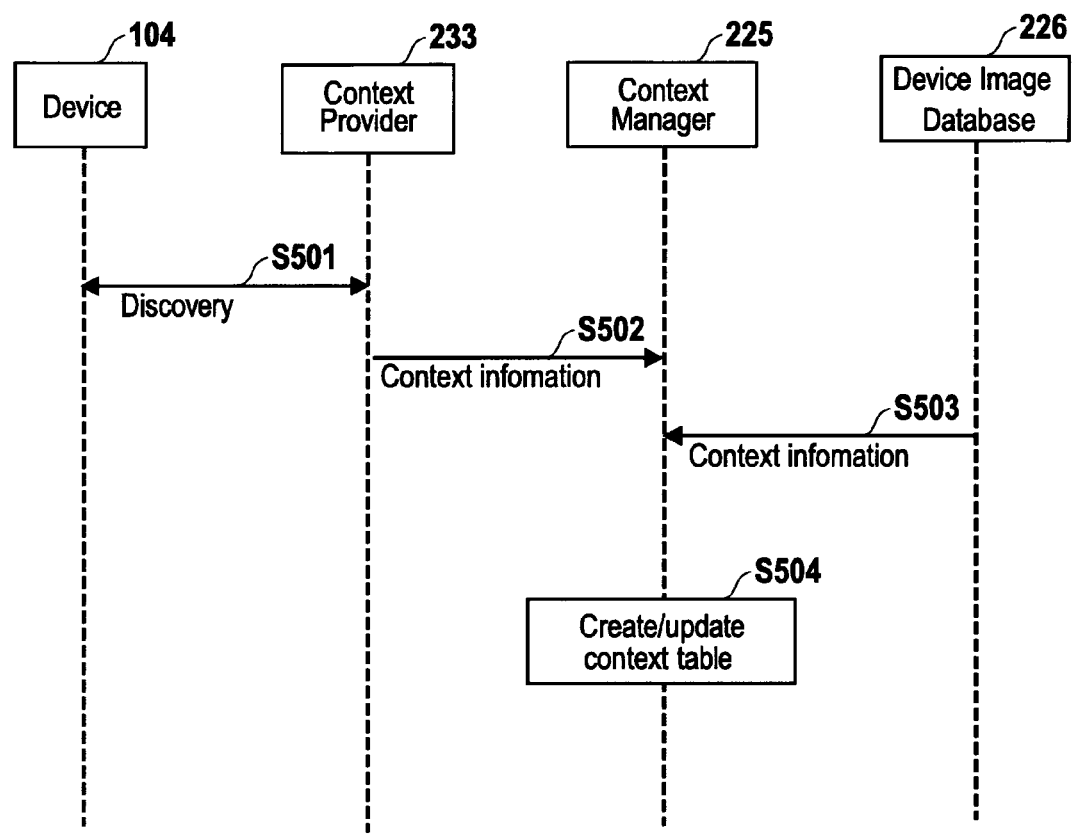
FIG. 5 illustrates an example of overall operations for managing the context table according to some embodiments.

FIG. 5 illustrates an example of overall operations for managing the context table 321 according to this embodiment. The CPU included in each device executes computer programs stored in memory of each device to process these operations.

In step S501, the context provider 233 discovers devices 104 which are connected to the same LAN 105 as the G/W 103, for example by the UPnP procedure. The context provider 233 then retrieves context information from the discovered device 104. The context information includes the device identity of the discovered device 104.

In step S502, the context provider 233 sends to the context manager 225 the LAN identity of the LAN 105 to which the discovered device 104 is connected, and the context information of the discovered device 104. The context provider 233 may use its identity as the LAN identity. When the context provider 233 supports more than one protocol, the context provider 233 may discover devices 104 connected to a LAN for each protocol. In that case, the context provider 233 may send to the context manager 225 a plurality of LAN identities with its identity. The context manager 225 receives the LAN identity and the context information (and the identity of the context provider 233 in same cases) from the context provider 233.

In step S503, the context manager 225 retrieves context information which is common in a device model of the discovered device 104 from the device image database 226. The context manager 225 may use the identity of the device model included in the context information obtained from the context provider 233 as a key. The context manager 225 may retrieve a link (for example, a URL) for context information instead of context information itself.

In step S504, the context manager 225 creates or updates an entry for the discovered device 104 in the context table using context information from the context provider 233 and the device image database 226. Steps S501 to S504 may be repeated so that the context table 321 stores the latest context information.

Figure 6:
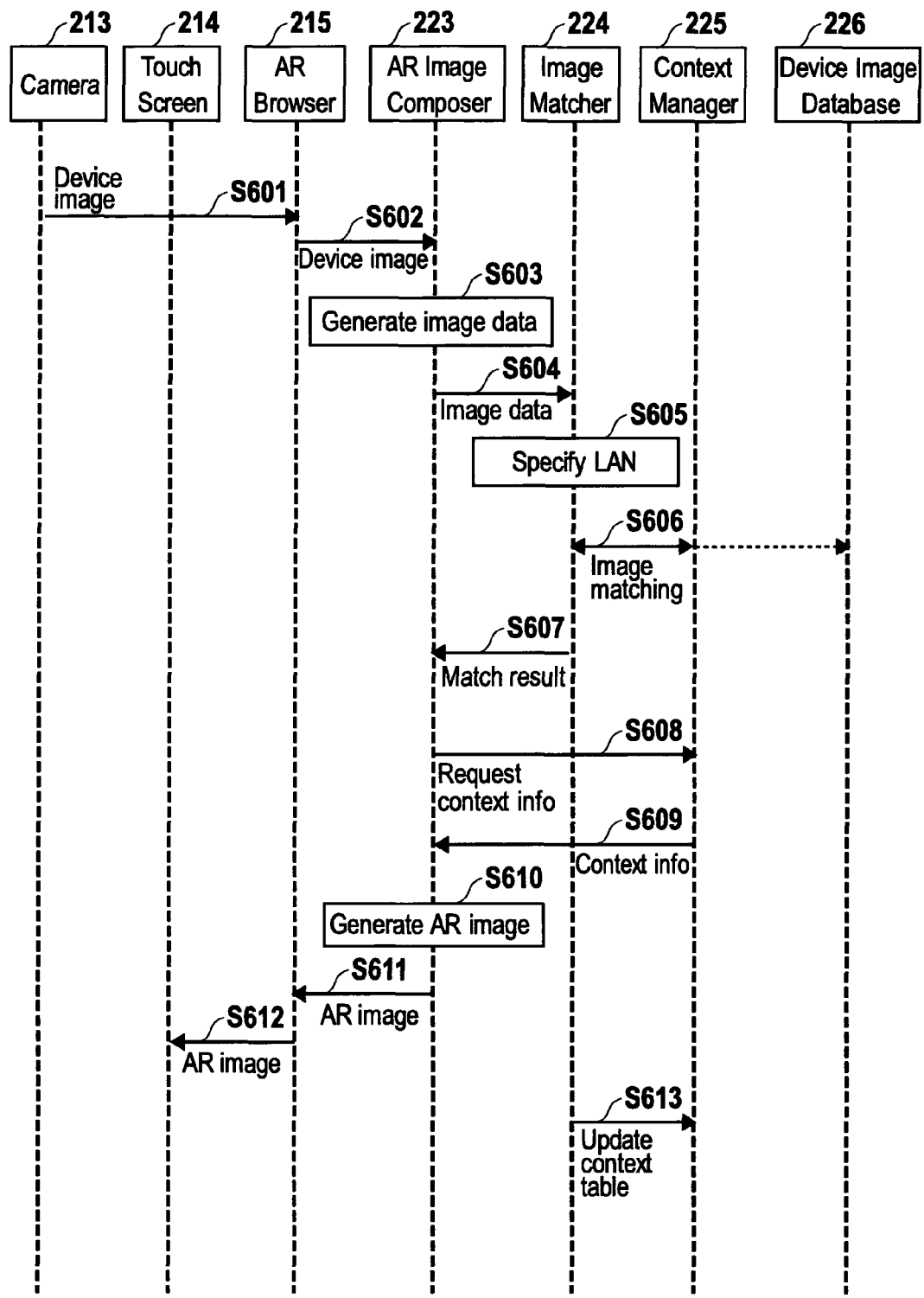
FIG. 6 illustrates an example of overall operations for generating an AR image according to this embodiment.

FIG. 6 illustrates an example of overall operations for generating an AR image according to this embodiment. The CPU included in each device executes computer programs stored in memory of each device to process these operations. There operations may be performed in parallel to the operations described in FIG. 6.

Figure 7:
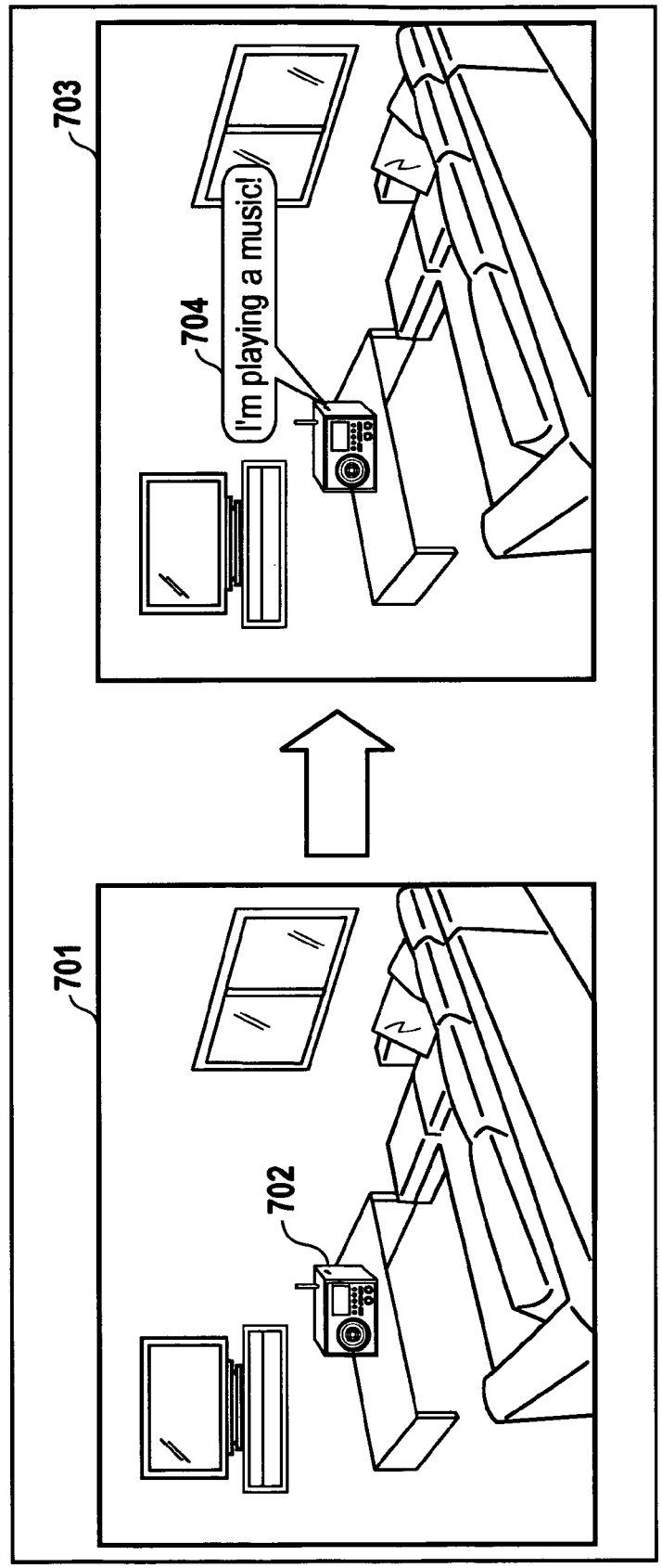
FIG. 7 illustrates an exemplary captured image and AR image.

In step S601, the user 107 moves the mobile phone 210 to capture a device 104 and the camera captures an image including a device image and sends the captured image to the AR browser 215. FIG. 7 shows an example of the captured image. The captured image 701 includes a device image 702 of a device 104 (for example, an audio device). In this step, the AR browser 215 may wait for an image from the camera 213 to be stable. Motion and direction sensors (not shown) of the mobile phone 210 may be utilized to determine the stability as well as the comparison between consecutive camera images. In addition, the AR browser 215 may wait for a user's input in order to determine a device image to be identified when two or more device are included in the captured image. For example, the user 107 wants to point out the device 104 on the touch screen 214 only which the user 107 wants to obtain the information about.

In step S602, the AR browser 215 sends the captured image 701 to the AR image composer 223. In step S603, the AR image composer 223 extracts a device image 702 from the captured image 701 and creates image data of the captured device 104 based on the device image 702. When the captured image 701 includes two or more device images, the AR image composer 223 may choose one of the device images which is, for example, located near the center of the captured image 701. Alternatively, the AR image composer 223 may extract device images of each device. In that case, the following processes are performed for each device image. Alternatively, the AR image composer 223 may create image data from the entire captured image including one or more devices. In step S604, the AR image composer 223 sends the image data of the captured device 104 to the image matcher 224 and requests to return the device identity of the captured device 104. Image matcher 224 may return more than one device identity if multiple devices have been matched in the image data. Image matcher 224 may return the position and size of the captured device 104 in the captured image 701.

In step S605, the image matcher 224 specifies one or more LANs to be used for image matching. When the mobile phone 210 communicates with the PNAS 220 via the G/W 230, the image matcher 224 may assume that the captured device 104 and the mobile phone 210 are connected to the same LAN and may select the LAN managed by the G/W 230 as a LAN to be used for image matching. Alternatively, the image matcher 224 may receive the LAN identity of the LAN 105 from the mobile phone 210 with the captured image 701. The mobile phone 210 may obtain the LAN identity by an input from the user 107. One or more LAN identities to be used for image matching may be preset in the mobile phone 210 or in the PNAS 220. When the image matcher 224 obtains an identity of the context provider 233, the image matcher 224 may specify one or more LANs managed by the G/W 230 including the context provider 233. The image matcher 224 may obtain the identity of the context provider 223 from the mobile phone 210. Alternatively, the image matcher 224 may store a identity of context provider which is associated with an identity of a mobile phone and obtain the identity of the mobile phone to identify the stored identity of the context provider. The user 107 may register to the PNAS 220 one or more LANs which the user 107 wants to be used for image matching.

In step S606, the image matcher 224 performs image matching of the image data of the captured device 104 as described above. In step S607, the image matcher 224 returns a device identity of the captured device 104 to the AR image composer 223. When the captured image includes more than one device image, the image matcher 224 may return more than one device identity. In step S608, the AR image composer 223 requests context information of the captured device 104 for the context manager 225 using the device identity as a key. In step S609, the context manager 225 returns the context information to the AR image composer 223. In step S610, the AR image composer 223 generates an AR image 703 as shown in FIG. 7 by overlaying the context information 704 of the captured device 104 onto the captured image 701.

In step S611, the AR image composer 223 sends the AR image 703 to the AR browser 215. In step S612, the AR browser 215 displays the AR image 703 on the touch screen 214.

In step S613, the image matcher 224 may update the context table 321 in the context manager 225 with the result of the image matching in order to improve performance of the comparison at next time. The image data of the captured device 104 should represent the latest device image of the captured device 104. Therefore, the image matcher 224 may update the set of image data stored in the context table 321 by use of the image data obtained at the step S604. For example, the image matcher 224 may replace the image data stored in the context table 321 by the obtained image data. Also, when the image data obtained at the step S604 captures the device 104 from different angles and in different distance, the obtained image data may be added to the set of image data stored in the context table 321.

Some variations of the present embodiment will now be described. These variations can also apply to other embodiments described later. The image matcher 224 may further narrow the candidate devices by use of information of the surroundings such as Wifi SSIDs discovered by the mobile phone 210, the value of angle sensors of the mobile phone 210 and the camera capability. In addition or alternatively, the context manager 225 may sort the candidate devices so that the one with the highest probability comes first, and devices with lower probability follow. The image matcher 224 may skip image matching against a candidate device which the image matcher 224 determines that the camera 213 cannot capture at the current location of the mobile phone 210. For example, a car navigation device cannot be captured by the camera 213 if the user 107 is at home and the car is far away driving. There's no single algorithm to determine the probability for a device to be captured by the camera 213, but can be estimated by several ways. The image matcher 224 may use the approximate location information of the mobile phone 210 and the distances from the home and the car, measured by the GPS, by the cellular network's triangular measurement, or provisioned in advance. The image matcher 224 may use the past image matching results and the frequency that the user 107 has interacted with the device 104 before. The image matcher 224 may estimate the approximate location and angle of the camera 213 if the relative position between the mobile phone 210 and a device 104 is known from the past image matching. For example, there are a TV and a stereo in the room and the TV and stereo are located in a way the camera 213 can never capture them at the same time, then the stereo can be removed from the candidate device while the TV is in the captured image.

Second Embodiment

Figure 8:
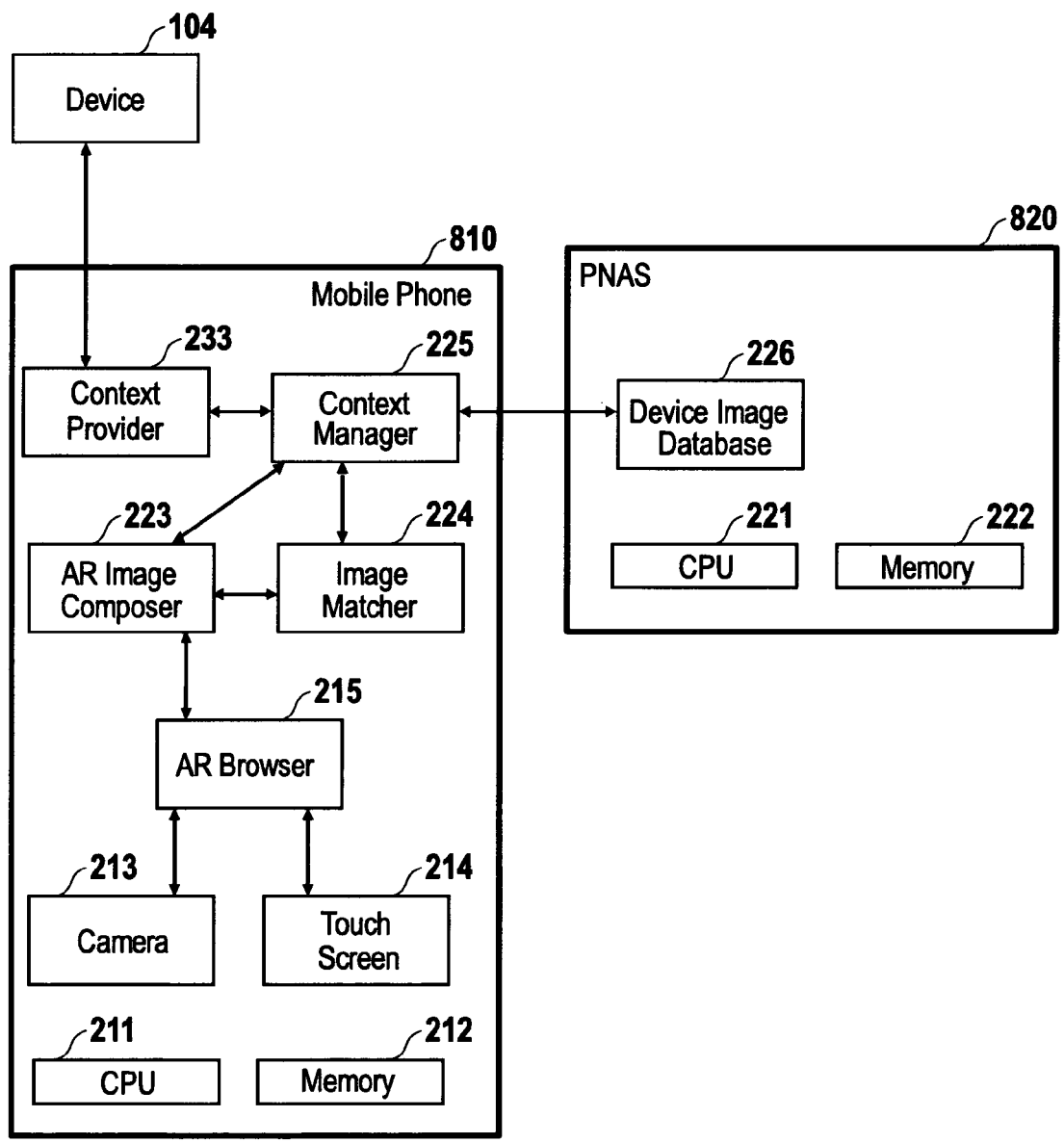
FIG. 8 illustrates an exemplary deployment of components according to a second embodiment.

FIG. 8 illustrates an exemplary configuration of each device in the system 100 according to a second embodiment of the present invention. A mobile phone 810 and a PNAS 820 correspond to the mobile phone 101 and the PNAS 102 respectively. The G/W 103 is not included in the system according to this embodiment. In the second embodiment, the mobile phone 810 operates as an image matching apparatus. The function and operation of components shown in FIG. 8 are similar to components shown in FIG. 2 and thus the description of these components will be omitted. In this embodiment, the mobile phone 810 includes the CPU 211, memory 212, the camera 213, the touch screen 214, the AR browser 215, the AR image composer 223, the image matcher 224, the context provider 233, and the context manager 225.

Because the mobile phone 810 includes the context provider 233, the mobile phone 810 can discover devices 104. The context manager 225 may manage the devices discovered by the context provider 233 in the same mobile phone 810.

The mobile phone 810 may have another AR browser application such as Sekai-camera and use the AR browser application while the context provider 233 does not discover any devices. When the context provider 233 discovers a device 104, the mobile phone 810 may use the AR browser 215 instead.

Third Embodiment

FIG. 9 illustrates an exemplary configuration of each device in the system 100 according to a third embodiment of the present invention. A mobile phone 910, a PNAS 920, and a G/W 930 correspond to the mobile phone 101, the PNAS 102, and the G/W 103 respectively. In the third embodiment, both of the PNAS 920 and the mobile phone 910 operate as an image matching apparatus. That is, the mobile phone 910 includes an image matcher 224a and a context manager 225a and the PNAS 920 includes an image matcher 224b and a context manager 225b. The function and operation of components shown in FIG. 9 are similar to components shown in FIG. 2 and thus the description of these components will be omitted.

In this embodiment, the PNAS 920 may provide more powerful image matching than that provided by the mobile phone 910. The PNAS 920 would have more processing power than that of the mobile phone 910. Therefore, it can happen that image matching performed by the image matcher 224a in the mobile phone 910 fails but image matching performed by the image matcher 224b in the PNAS 920 succeed.

Thus, the AR image composer 223 may request for image matching to the image matcher 224a first and to image matcher 225b next.

Furthermore, it can happen that the context manager 225a, 225b does not include an entity for the captured device when the context provider 233 could not discover the captured device for example. In that case, the image matcher 224b in the PNAS 920 may compare the image data of the captured device 104 against image data stored in the device image database 226.

In this embodiment, the context manager 225a may work as a cache of the context manager 225b. That is, a context table in the context manager 225a may be a subset of a context table in the context manager 225b. Assume that the context manager 225 includes the context table 321 shown in FIG. 4. When the mobile phone 210 is associated with the context provider 233 in the G/W 230 (for example when the mobile phone 210 is connecting to the internet 106 via the G/W 230 or when the user 107 registers the association between the mobile phone 210 and the G/W 230 to the PNAS 220), the context table in the context manager 225a may only include the entities 410 whose LAN identities correspond to the G/W 930. Association between the mobile phone 910 and the context provider 233 may be maintained in the Home Subscriber Server, Active Address Book, Presence and Resource list XDMS in the IP Multimedia Subsystem etc. When the context manager 225a receives data from the context manager 225b, the context manager 225b may authorize the context manager 225a. The subscription of the mobile phone 910 may be used for the authentication. This authorization may be performed in other embodiments. The context manager 225a may obtain context information from the context provider 233 and/or devices 104 instead of or in addition to from the context manager 225b.

Figure 10:
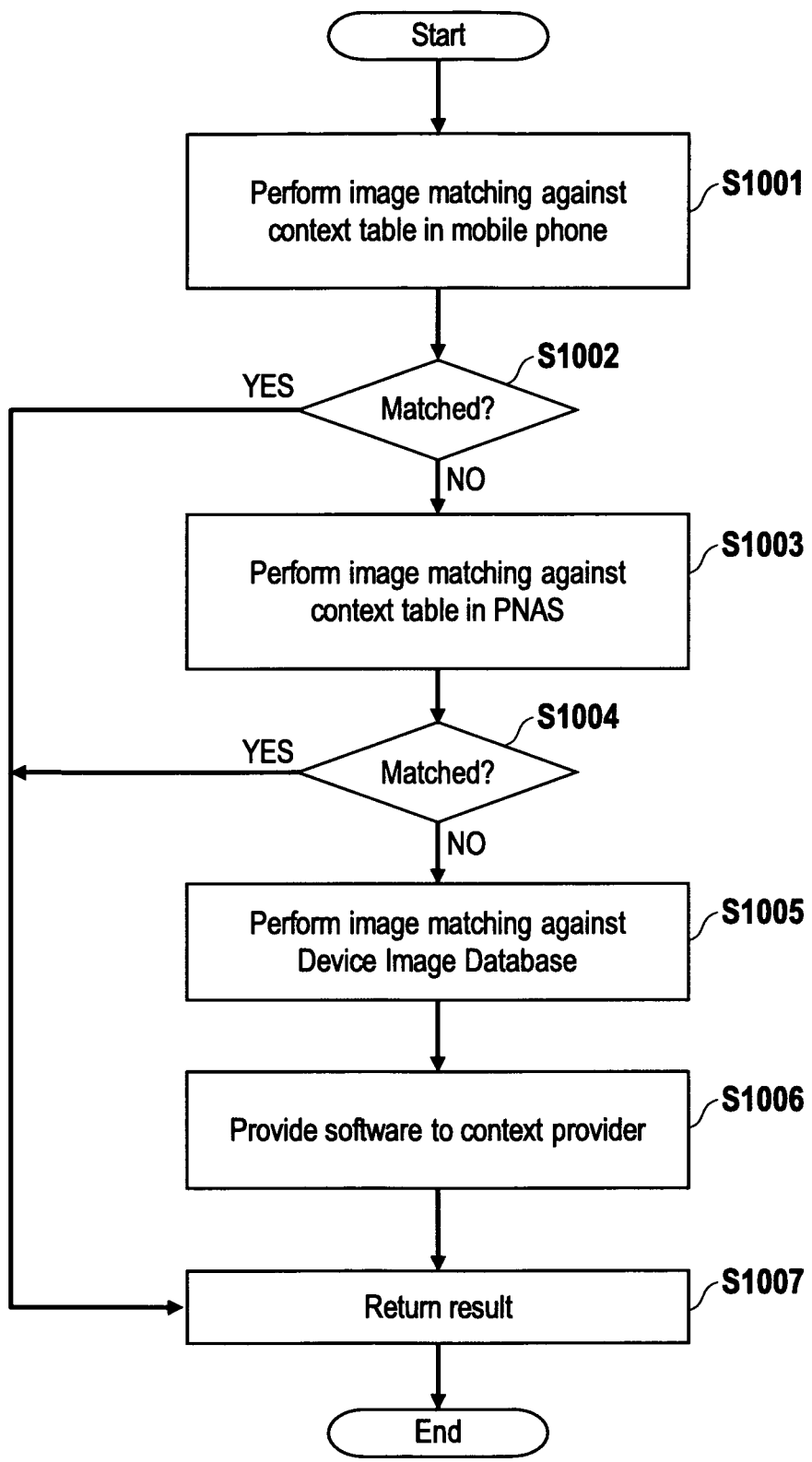
FIG. 10 illustrates an example of overall operations for performing image matching according to the third embodiment.

FIG. 10 illustrates an example of overall operations for performing image matching according to this embodiment. The operations in FIG. 10 are performed at step S606 in FIG. 6. The CPU included in each device executes computer programs stored in memory of each device to process these operations.

In step S1001, the AR image composer 223 requests for performing image matching of image data of a captured device 104 to the image matcher 224a. In step S1002, the image matcher 224a compares the image data of the captured device 104 against image data of the candidate devices managed by the context manager 225a. When there is a matched candidate device ("YES" in step S1002), the image matcher 224a returns the device identity of the matched candidate device to the AR image composer 223. When there is not any matched candidate devices ("NO" in the step S1002), the processes proceed to step S1003.

In step S1003, the AR image composer 223 requests for performing image matching of image data of a captured device 104 to the image matcher 224b. In step S1004, the image matcher 224b compares the image data of the captured device 104 against image data of the candidate devices managed by the context manager 225b. When there is a matched candidate device ("YES" in step S1004), the image matcher 224b returns the device identity of the matched candidate device to the AR image composer 223. When there is not any matched candidate devices ("NO" in the step S1004), the processes proceed to step S1005.

In step S1005, the image matcher 224b compares the image data of the captured device 104 against image data stored in the device image database 226. In this case, the image matcher 224b cannot return the device identity of the captured device 104. Thus, the image matcher 224b may return context information relating to the device model of the captured device 104 to the AR image composer 223 in step S1007.

One possible reason why the context managers 225a, 225b do not include an entity for the captured device 104 is that the captured device 104 is using a protocol which is not supported by the context provider 233. In this case it is possible to upgrade the context provider 233 by installing software handling the protocol set to discover the device and retrieve the context information of the device. In step S1006, the software provision unit 324 in the context manager 225b obtains such software using the device model identity obtained at step S1005 as a key from the device image database 226 or a device manufacturer server. The software provision unit 324 queries the context provider 233 to see if the software is already installed and if it's possible to install otherwise using TR-069 for example. The query can be skipped if the software provision unit 324 is aware of the Context Provider's status. The software provision unit 324 installs the software to the context provider 233. The context provider 233 starts the installed software and discovers the device which was not discovered. After that, the context managers 225a, 225b can manage the device which has installed the software through the procedure described in FIG. 5. The image matcher 224b may return the result before step S1006 takes place, because the process to install the software to the context provider 233 takes time. In that case, the image matcher 224b will receive new image data from the AR image composer after the software installation is completed and the device 104 is discovered by the context provider 233, and the image matcher 224b can return the context information of the device by running step S1005 for the new image data.

Fourth Embodiment

Figure 11:
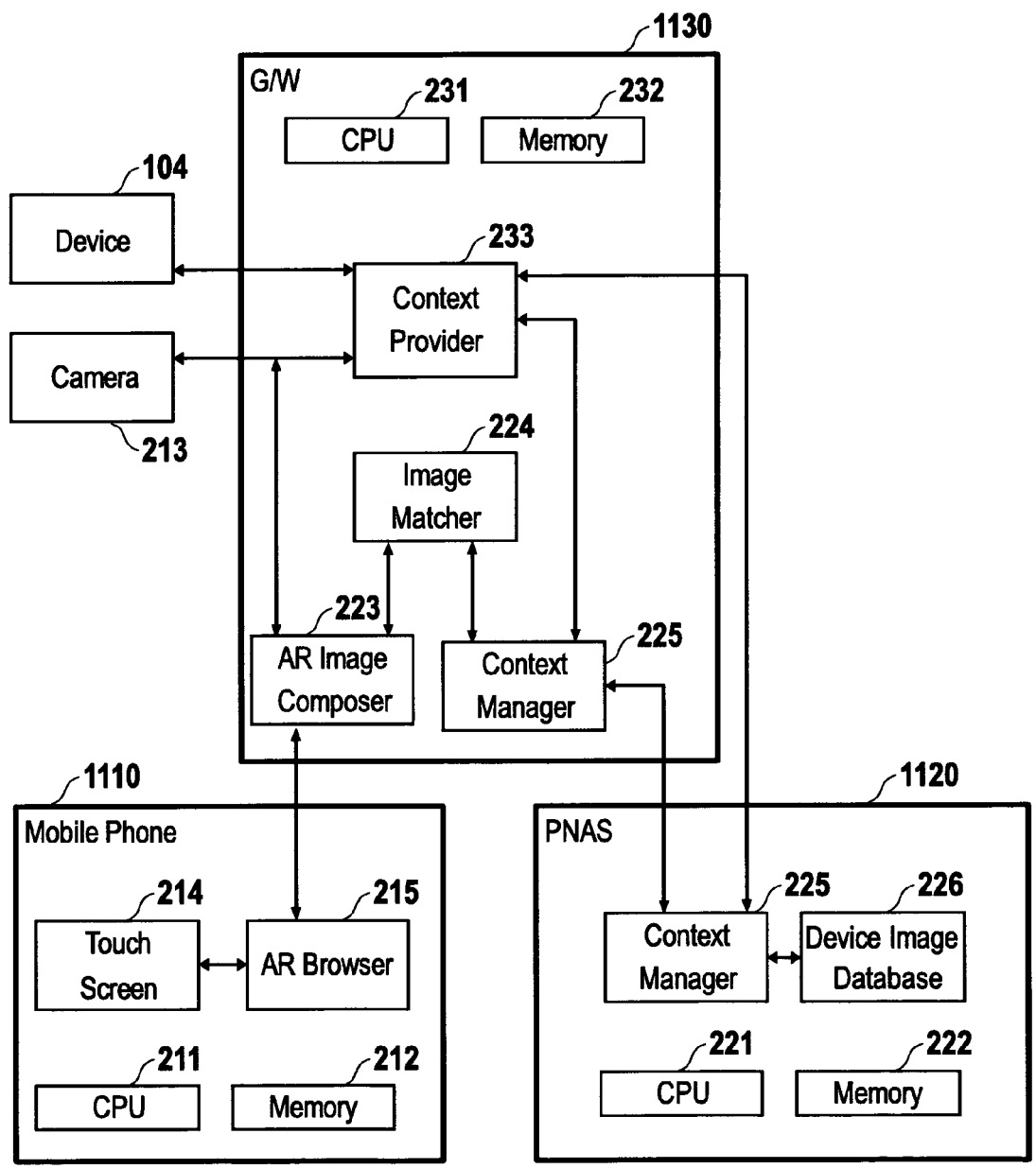
FIG. 11 illustrates an exemplary deployment of components according to a fourth embodiment.

FIG. 11 illustrates an exemplary configuration of each device in the system 100 according to a fourth embodiment of the present invention. A mobile phone 1110, a PNAS 1120, and a G/W 1130 correspond to the mobile phone 101, the PNAS 102, and the G/W 103 respectively. In the fourth embodiment, the G/W 1130 operates as an image matching apparatus. That is, the G/W 1130 includes the CPU 231, the memory 232, the context provider 233, the image matcher 224, the AR image composer 223, and the context manager 225. Furthermore, the camera 213 is located at a different place than the mobile phone 1110 and works as, for example, a surveillance camera in an office. The function and operation of components shown in FIG. 11 are similar to components shown in FIG. 2 and thus the description of these components will be omitted.

An image captured by the camera 213 is transferred to the AR image composer 223 in the G/W 1130. The AR image composer 223 then generates an AR image and provides the AR image to the mobile phone 1110. The user 107 can interact with the devices 104 found in the display remotely according to the context information overlaid to the captured image. In this embodiment, the movement of the mobile phone 1110 or the control on the touch screen 214 may be connected to the tilt, pan and zooming control of the remote camera 213. The camera angle and zooming ratio derived from these controls or obtained from the camera 213 itself can be utilized to sort and narrow down the candidate device as discussed in the first embodiment.

The mobile phone 1110 may have a built-in camera and the AR browser 215 may present both images from the camera 213 and the built-in camera by assigning the upper half of the touch screen 214 to the camera image and the lower to the other for example. The AR browser 215 enables the user 107 to interact with these screens at the same time, passing an object or information from one screen to another. The AR browser 215 may discover the camera 213 in the captured image of the built-in camera. Then the PNAS 1120 may connect to the camera 213 and discover devices in the captured images of the built-in camera. When the camera 213 was discovered by AR browser 215, the rough position of the camera 213 may be provided to the context provider 233 as a part of the context information to improve accuracy of estimation. The rough position of the camera 213 again may be estimated by using the relative location from other known devices in the AR browser 215 and also using the various sensors in the mobile phone 1110.

Other Embodiments

In the embodiments described above, the image matching technique according to the present invention is described in the context of the AR application. However, the image matching technique is not limited to the AR application. For example, the AR image composer 223 or the AR Browser 213 may obtain data relating to the captured device 104 instead of or in addition to the context information of the captured device 104. The data relating to the captured device 104 may include software for controlling the captured device 104 and an advertisement associated with the captured device 104. When the captured device 104 is a TV for example, the mobile phone 101 may obtain software with which the mobile phone 101 works as a remote controller of the TV. The data may include posts and comments related to the captured device 104 in social networking services, blog, and micro blog services on the Internet, which is obtained by optionally taking the end user's social relationship on these services into account. The data may also include software patch and firmware update information, recommendation or advertisement of new software which runs in the device 104, obtained from the vendor of the device 104. AR Browser 213 may display the obtained data, software, or a part of them, together with the captured image.

According to the embodiments of the present invention, processing time and accuracy of image matching are improved. Furthermore, the first embodiment provides an advantage that the solution is applicable to a mobile device where the computational resource is constrained. The second embodiment provides an advantage that the feedback to the end user is given quickly as the image matching and overlaying of the information are taken place locally in the mobile device. It also less demanding of the network resources compared to the first embodiment. The third embodiment provides a hybrid solution where the images are processed locally by an algorithm requiring less computational resource and the result is compensated by an advanced and/or resource demanding algorithm.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

The invention claimed is:

1. An image matching apparatus comprising:
    a storage unit that stores image data of one or more devices that are connected to the storage unit through a plurality of local networks;
    an obtaining unit configured to obtain image data of a device image obtained by a capturing device comprising a mobile terminal;

a specification unit configured to specify one or more of the local networks to be used for image matching;

an image matching unit configured to perform image matching of the image data obtained by the obtaining unit against the image data stored in the storage unit of one or more devices that are connected to the specified one or more of the local networks~and to obtain data relating to the capturing device by use of a result of the image matching; and a database that stores image data based on device models, wherein the apparatus comprises a server that provides an image matching service to the mobile terminal, and wherein the image matching unit is further configured to perform image matching of the obtained image data against the image data stored in the database in response to no image data being determined to match by the image matching unit against the image data stored in the storage unit.

2. The apparatus according to claim 1, wherein the data relating to the capturing device includes at least one of context information relating to the capturing device, software for controlling the capturing device, and an advertisement associated with the capturing device.

3. The apparatus according to claim 1, wherein the image matching unit is further configured to reduce the number of the image data to be used for the image matching or change the order of image data to be used for the image matching, based on a condition determined when the device image is obtained by the capturing device.

4. The apparatus according to claim 1, further comprising another unit configured to store the obtained image data in the storage unit as the image data of the capturing device.

5. The apparatus according to claim 1, wherein:
the obtaining unit is further configured to receive the device image of the captured device from the mobile terminal, and the apparatus further comprising:
a unit configured to generate an Augmented Reality image by overlaying the data relating to the capturing device to the received device image, and
a unit configured to send the generated Augmented Reality image to the mobile terminal.

6. The apparatus according to claim 1, further comprising a unit configured to provide a gateway of the specified local network or a mobile terminal-with software which enables the gateway or the mobile terminal to discover the captured device when no image data is matched at the image matching against the image data stored in the storage unit.

7. An image matching apparatus comprising:
a storage unit that stores image data of one or more devices that are connected to the storage unit through a plurality of local networks;

an obtaining unit configured to obtain image data of a device image obtained by a capturing device, and to obtain the device image of the captured device;

a specification unit configured to specify one or more of the local networks to be used for image matching;

an image matching unit configured to perform image matching of the image data obtained by the obtaining unit against the image data stored in the storage unit of one or more devices that are connected to the specified one or more of the local networks, and to obtain data relating to the capturing device by use of a result of the image matching;

a Augmented Reality generating unit configured to generate an Augmented Reality image by overlaying the data relating to the capturing device to the obtained device image; and a display unit configured to display the generated Augmented Reality image, wherein the apparatus is further configured to request a server that provides an image matching service to perform image matching of the obtained image data in response to no image data being determined to match by the image matching unit against the image data stored in the storage unit.

8. The apparatus according to claim 7, further comprising an image forming unit configured to capture the device image.

9. An image matching method by use of a storage unit that stores image data of one or more devices that are connected to the storage unit through a plurality of local networks, the method comprising:

obtaining image data of a device image obtained by a capturing device comprising a mobile terminal;

specifying one or more of the local networks to be used for image matching;

performing image matching of the obtained image data against the stored image data of one or more devices that are connected to the specified one or more of the local networks;

obtaining data relating to the capturing device by use of a result of the image matching; and performing image matching of the obtained image data against image data stored in a database based on device model, in response to no image data being determined to match at the image matching against the image data stored in a storage unit associated with the capturing device.

* * * * *

UNITED STATES PATENT AND TRADEMARK OFFICE
CERTIFICATE OF CORRECTION

Page 1 of 1

PATENT NO. : 9,098,948 B2
APPLICATION NO. : 13/877273
DATED : August 4, 2015
INVENTOR(S) : Matsumura et al.

It is certified that error appears in the above-identified patent and that said Letters Patent is hereby corrected as shown below:

In the claims

Column 13, Line 7, Claim 1, delete "networks~and" and insert -- networks, and --, therefor.

Signed and Sealed this
Nineteenth Day of January, 2016

Michelle K. Lee
*Director of the United States Patent and Trademark Office*